United States Patent
Marumoto (10) Patent No.: US 12,427,703 B2
(45) Date of Patent: Sep. 30, 2025

(54) INJECTION MOLDING MACHINE

(71) Applicant: SUMITOMO HEAVY INDUSTRIES, LTD., Tokyo (JP)

(72) Inventor: Hirotsugu Marumoto, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 54 days.

(21) Appl. No.: 18/527,133

(22) Filed: Dec. 1, 2023

(65) Prior Publication Data
US 2024/0198571 A1    Jun. 20, 2024

(30) Foreign Application Priority Data
Dec. 15, 2022    (JP) .................. 2022-200054

(51) Int. Cl.
*B29C 45/76*    (2006.01)
*B29C 45/50*    (2006.01)

(52) U.S. Cl.
CPC .............. *B29C 45/76* (2013.01); *B29C 45/50* (2013.01); *B29C 45/5008* (2013.01); *B29C 2945/76187* (2013.01); *B29C 2945/762* (2013.01); *B29C 2945/76568* (2013.01); *B29C 2945/76665* (2013.01)

(58) Field of Classification Search
CPC ............ B29C 2945/76187; B29C 45/76
See application file for complete search history.

(56) References Cited

U.S. PATENT DOCUMENTS

| 6,118,374 A * | 9/2000 | Saatkamp ........... B29C 48/2562 340/572.1 |
| 2005/0053687 A1 | 3/2005 | Pitscheneder et al. |
| 2015/0037447 A1 | 2/2015 | Rechter et al. |
| 2015/0148932 A1 * | 5/2015 | Rechter .................. B29C 48/96 700/109 |

FOREIGN PATENT DOCUMENTS

| AT | 007303 U1 | 1/2005 |
| DE | 102020110535 A1 | 10/2020 |
| JP | 2018-008424 A | 1/2018 |
| WO | WO 2021/255010 A1 | 12/2021 |

OTHER PUBLICATIONS

Office Action of the corresponding DE 102023133740.8 mailed on Feb. 18, 2025.

* cited by examiner

*Primary Examiner* — John J DeRusso
(74) *Attorney, Agent, or Firm* — WTA IP Law P.C.

(57) ABSTRACT

An injection molding machine includes a screw to which a tag including identification information that is readable by a reading unit is attached, a drive unit that performs rotation and advancing and retreating of the screw, and a control device that controls the drive unit, the control device performs a control of moving of the tag to a reading position at which the identification information is read by the reading unit.

6 Claims, 8 Drawing Sheets

INJECTION MOLDING MACHINE

CROSS-REFERENCE TO RELATED APPLICATIONS

This application claims priority to Japanese Patent Application No. 2022-200054, filed on Dec. 15, 2022, which is incorporated by reference herein in its entirety.

BACKGROUND

Technical Field

A certain embodiment of the present invention relates to an injection molding machine.

Description of Related Art

The related art discloses an injection molding machine including a cylinder, a nozzle provided at a front end of the cylinder, and a screw provided inside the cylinder. In a case where the screw is rotated, a resin having a pellet shape is fed forward along a helical groove of the screw. The resin is gradually melted by heat from the cylinder while being fed forward. As the molten resin accumulates in front of the screw, the screw is retreated. After that, when the screw is advanced, the liquid resin accumulated in front of the screw is ejected from the nozzle. A tag having identification information of the screw is attached to the screw.

SUMMARY

An injection molding machine according to an aspect of the present invention includes a screw to which a tag including identification information that is readable by a reading unit is attached, a drive unit that performs rotation and advancing and retreating of the screw, and a control device that controls the drive unit. The control device controls the tag to be directed toward the reading unit in a case where the identification information is read by the reading unit.

DETAILED DESCRIPTION

The related art discloses that a tag having identification information of a screw is attached to the screw. However, a configuration (a configuration in which powder dust of a resin is leaked rearward from inside of a plasticizing cylinder) which is not adopted by those skilled is illustrated in drawings, and a specific configuration is not clear.

According to an aspect of the present invention, the screw can be identified.

Embodiments of the present invention will be described below with reference to the drawings. The same or corresponding configuration will be denoted in the respective drawings by the same reference numerals, and the description thereof will be omitted.

Injection Molding Machine

Figure 1:
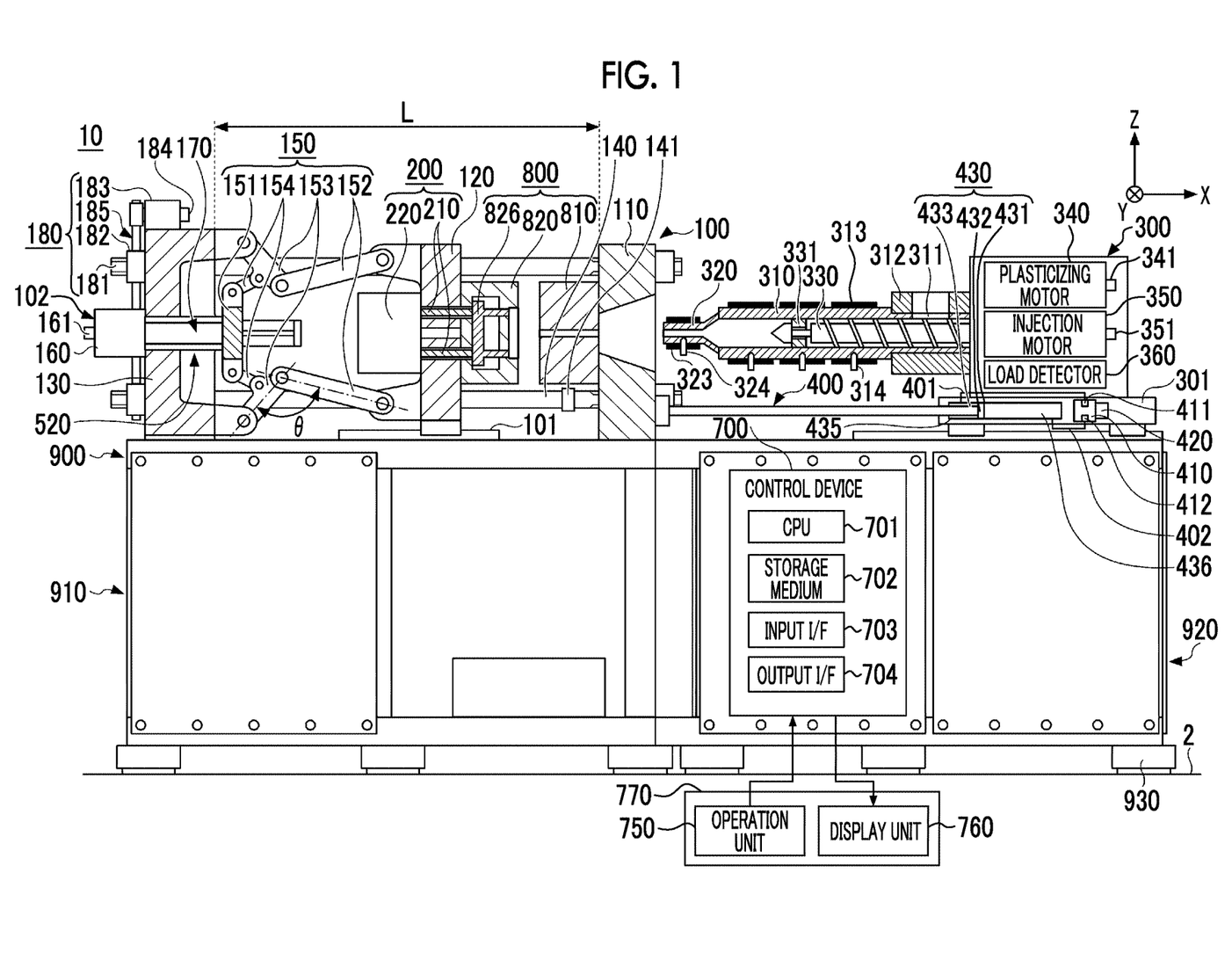
FIG. 1 is a diagram showing a state of an injection molding machine according to an embodiment at a time of completion of mold opening.
Figure 2:
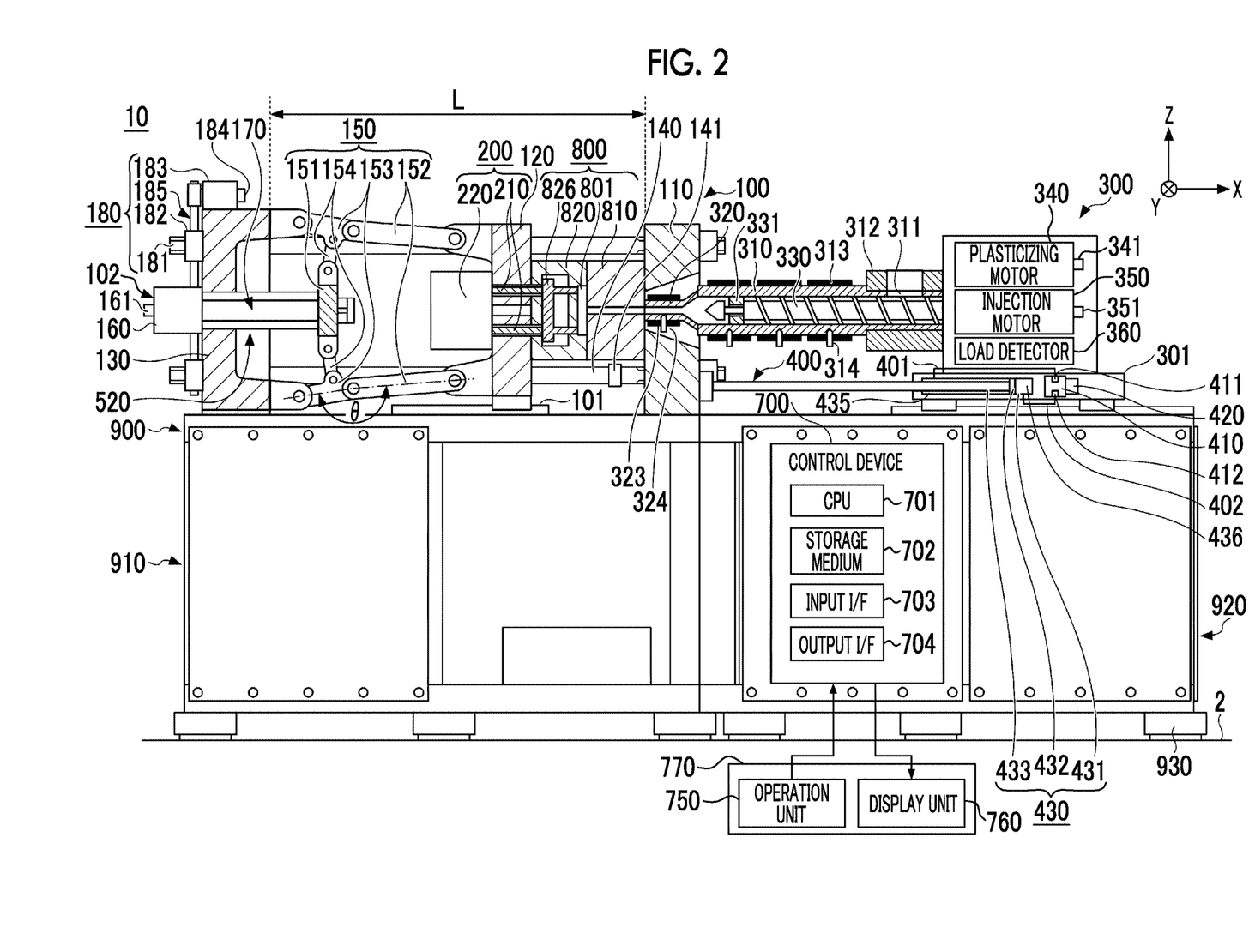
FIG. 2 is a diagram showing a state of the injection molding machine according to the embodiment at a time of mold clamping.

FIG. 1 is a diagram showing a state of an injection molding machine according to an embodiment at a time of completion of mold opening. FIG. 2 is a diagram showing a state of the injection molding machine according to the embodiment at a time of mold clamping. In this specification, an X-axis direction, a Y-axis direction, and a Z-axis direction are directions perpendicular to each other. The X-axis direction and the Y-axis direction indicate horizontal directions, and the Z-axis direction indicates a vertical direction. In a case where a mold clamping unit 100 is of a horizontal type, the X-axis direction is a mold opening/closing direction and the Y-axis direction is a width direction of an injection molding machine 10. A negative side in the Y-axis direction is referred to as an operation side, and a positive side in the Y-axis direction is referred to as a counter-operation side.

As shown in FIGS. 1 and 2, the injection molding machine 10 includes a mold clamping unit 100 that opens and closes a mold unit 800, an ejector unit 200 that ejects molding products molded by the mold unit 800, an injection unit 300 that injects a molding material into the mold unit 800, a moving unit 400 that causes the injection unit 300 to advance and retreat with respect to the mold unit 800, a control device 700 that controls the respective components of the injection molding machine 10, and a frame 900 that supports the respective components of the injection molding machine 10. The frame 900 includes a mold clamping unit frame 910 that supports the mold clamping unit 100, and an injection unit frame 920 that supports the injection unit 300. The mold clamping unit frame 910 and the injection unit frame 920 are installed on a floor 2 via leveling adjusters 930, respectively. The control device 700 is disposed in an internal space of the injection unit frame 920. The respective components of the injection molding machine 10 will be described below.

Mold Clamping Unit

In the description of the mold clamping unit 100, a moving direction of a movable platen 120 in a case where a mold is to be closed (for example, an X-axis positive direction) will correspond to a front, and a moving direction of the movable platen 120 in a case where the mold is to be opened (for example, an X-axis negative direction) will correspond to a rear.

The mold clamping unit 100 performs mold closing, pressurization, mold clamping, depressurization, and mold opening of the mold unit 800. The mold unit 800 includes a stationary mold 810 and a movable mold 820.

The mold clamping unit 100 is of, for example, a horizontal type, and the mold opening/closing direction of the mold clamping unit 100 is a horizontal direction. The mold clamping unit 100 includes a stationary platen 110 to which the stationary mold 810 is attached, the movable platen 120 to which the movable mold 820 is attached, and a moving mechanism 102 that moves the movable platen 120 with respect to the stationary platen 110 in the mold opening/closing direction.

The stationary platen 110 is fixed to the mold clamping unit frame 910. The stationary mold 810 is attached to a surface of the stationary platen 110 facing the movable platen 120.

The movable platen 120 is disposed to be movable with respect to the mold clamping unit frame 910 in the mold opening/closing direction. Guides 101 that guide the movable platen 120 are laid on the mold clamping unit frame 910. The movable mold 820 is attached to a surface of the movable platen 120 facing the stationary platen 110.

The moving mechanism 102 causes the movable platen 120 to advance and retreat with respect to the stationary platen 110 to perform mold closing, pressurization, mold clamping, depressurization, and mold opening of the mold unit 800. The moving mechanism 102 includes a toggle support 130 that is disposed with an interval between the stationary platen 110 and itself, tie bars 140 that connect the stationary platen 110 to the toggle support 130, a toggle mechanism 150 that moves the movable platen 120 with respect to the toggle support 130 in the mold opening/closing direction, a mold clamping motor 160 that operates the toggle mechanism 150, a motion conversion mechanism 170 that converts a rotary motion of the mold clamping motor 160 into a linear motion, and a mold space adjustment mechanism 180 that adjusts an interval between the stationary platen 110 and the toggle support 130.

The toggle support 130 is disposed with an interval between the stationary platen 110 and itself, and is placed on the mold clamping unit frame 910 to be movable in the mold opening/closing direction. The toggle support 130 may be disposed to be movable along guides laid on the mold clamping unit frame 910. The guides for the toggle support 130 may be common to the guides 101 for the movable platen 120.

In the present embodiment, the stationary platen 110 is fixed to the mold clamping unit frame 910, and the toggle support 130 is disposed to be movable with respect to the mold clamping unit frame 910 in the mold opening/closing direction. However, the toggle support 130 may be fixed to the mold clamping unit frame 910, and the stationary platen 110 may be disposed to be movable with respect to the mold clamping unit frame 910 in the mold opening/closing direction.

The tie bars 140 connect the stationary platen 110 to the toggle support 130 with an interval L between the stationary platen 110 and the toggle support 130 in the mold opening/closing direction. A plurality of (for example, four) tie bars 140 may be used. The plurality of tie bars 140 are disposed parallel to the mold opening/closing direction and extend depending on a mold clamping force. At least one tie bar 140 may be provided with a tie bar strain detector 141 that measures a strain of the tie bar 140. The tie bar strain detector 141 sends a signal indicating a detection result thereof to the control device 700. The detection result of the tie bar strain detector 141 is used for the measurement of a mold clamping force, and the like.

The tie bar strain detector 141 is used in the present embodiment as a mold clamping force detector for detecting a mold clamping force, but the present invention is not limited thereto. The mold clamping force detector is not limited to a strain gauge type and may be of a piezoelectric type, a capacitive type, a hydraulic type, an electromagnetic type, or the like. A position where the mold clamping force detector is attached is also not limited to the tie bar 140.

The toggle mechanism 150 is disposed between the movable platen 120 and the toggle support 130, and moves the movable platen 120 with respect to the toggle support 130 in the mold opening/closing direction. The toggle mechanism 150 includes a crosshead 151 that moves in the mold opening/closing direction and a pair of link groups that is bent and stretched depending on the movement of the crosshead 151. Each of the pair of link groups includes a first link 152 and a second link 153 that are bendably and stretchably connected to each other by a pin or the like. The first link 152 is oscillatingly attached to the movable platen 120 by a pin or the like. The second link 153 is oscillatingly attached to the toggle support 130 by a pin or the like. The second link 153 is attached to the crosshead 151 via a third link 154. In a case where the crosshead 151 is caused to advance and retreat with respect to the toggle support 130, the first link 152 and the second link 153 are bent and stretched, and the movable platen 120 advances and retreats with respect to the toggle support 130.

The configuration of the toggle mechanism 150 is not limited to the configuration shown in FIGS. 1 and 2. For example, the number of nodes of each link group is five in FIGS. 1 and 2 but may be four. One end portion of the third link 154 may be connected to the node between the first and second links 152 and 153.

The mold clamping motor 160 is attached to the toggle support 130 and operates the toggle mechanism 150. The mold clamping motor 160 causes the crosshead 151 to advance and retreat with respect to the toggle support 130, so that the first and second links 152 and 153 are bent and stretched to cause the movable platen 120 to advance and retreat with respect to the toggle support 130. The mold clamping motor 160 is directly connected to the motion conversion mechanism 170, but may be connected to the motion conversion mechanism 170 via a belt, pulleys, and the like.

The motion conversion mechanism 170 converts a rotary motion of the mold clamping motor 160 into a linear motion of the crosshead 151. The motion conversion mechanism 170 includes a screw shaft and a screw nut that is screwed to the screw shaft. Balls or rollers may be interposed between the screw shaft and the screw nut.

The mold clamping unit 100 performs a mold closing process, a pressurization process, a mold clamping process, a depressurization process, a mold opening process, and the like under the control of the control device 700.

In the mold closing process, the mold clamping motor 160 is driven to cause the crosshead 151 to advance up to a mold closing completion position at a set movement speed, so that the movable platen 120 is caused to advance and causes the movable mold 820 to touch the stationary mold 810. The position and the movement speed of the crosshead 151 are measured using, for example, a mold clamping motor encoder 161 or the like. The mold clamping motor encoder 161 measures rotation of the mold clamping motor 160, and sends a signal indicating a detection result thereof to the control device 700.

A crosshead position detector for measuring the position of the crosshead 151 and a crosshead movement speed detector for measuring the movement speed of the crosshead 151 are not limited to the mold clamping motor encoder 161, and general detectors can be used. Further, a movable platen position detector for measuring the position of the movable platen 120 and a movable platen movement speed detector for measuring the movement speed of the movable platen 120 are not limited to the mold clamping motor encoder 161, and general detectors can be used.

In the pressurization process, the mold clamping motor 160 is further driven to further cause the crosshead 151 to advance from the mold closing completion position up to a mold clamping position and to generate a mold clamping force.

In the mold clamping process, the mold clamping motor 160 is driven to maintain the position of the crosshead 151 at the mold clamping position. In the mold clamping process, the mold clamping force generated in the pressurization process is maintained. In the mold clamping process, cavity spaces 801 (see FIG. 2) are formed between the movable mold 820 and the stationary mold 810, and the injection unit 300 fills the cavity spaces 801 with liquid molding material. Molding products are obtained in a case where the molding material filling the cavity spaces is solidified.

One cavity space 801 may be provided, or a plurality of cavity spaces 801 may be provided. In the latter case, a plurality of molding products are obtained at the same time. An insert material may be disposed in a part of each cavity space 801, and the other part of each cavity space 801 may be filled with a molding material. Molding products in which the insert material and the molding material are integrated with each other are obtained.

In the depressurization process, the mold clamping motor 160 is driven to cause the crosshead 151 to retreat from the mold clamping position up to a mold opening start position, so that the movable platen 120 is caused to retreat to reduce the mold clamping force. The mold opening start position and the mold closing completion position may be the same position.

In the mold opening process, the mold clamping motor 160 is driven to cause the crosshead 151 to retreat from the mold opening start position up to a mold opening completion position at a set movement speed, so that the movable platen 120 is caused to retreat and causes the movable mold 820 to be separated from the stationary mold 810. After that, the ejector unit 200 ejects the molding products from the movable mold 820.

Set conditions in the mold closing process, the pressurization process, and the mold clamping process are collectively set as a series of set conditions. For example, movement speeds and positions (including a mold closing start position, a movement speed switching position, a mold closing completion position, and a mold clamping position) of the crosshead 151 and mold clamping forces in the mold closing process and the pressurization process are collectively set as a series of set conditions. The mold closing start position, the movement speed switching position, the mold closing completion position, and the mold clamping position are arranged in this order from a rear side toward the front, and indicate starting points and end points of sections in which the movement speeds are set. The movement speed is set for each section. One movement speed switching position may be set, or a plurality of movement speed switching positions may be set. The movement speed switching position may not be set. Only one of the mold clamping position and the mold clamping force may be set.

Set conditions in the depressurization process and the mold opening process are also set in the same manner. For example, movement speeds and positions (including the mold opening start position, the movement speed switching position, and the mold opening completion position) of the crosshead 151 in the depressurization process and the mold opening process are collectively set as a series of set conditions. The mold opening start position, the movement speed switching position, and the mold opening completion position are arranged in this order from a front side toward the rear, and indicate starting points and end points of sections in which the movement speeds are set. The movement speed is set for each section. One movement speed switching position may be set, or a plurality of movement speed switching positions may be set. The movement speed switching position may not be set. The mold opening start position and the mold closing completion position may be the same position. Further, the mold opening completion position and the mold closing start position may be the same position.

The movement speeds, the positions, and the like of the movable platen 120 may be set instead of the movement speeds, the positions, and the like of the crosshead 151. Further, a mold clamping force may be set instead of the position (for example, the mold clamping position) of the crosshead or the position of the movable platen.

The toggle mechanism 150 amplifies the driving force of the mold clamping motor 160 and transmits the amplified driving force to the movable platen 120. The amplification factor of the toggle mechanism 150 is also referred to as a toggle factor. The toggle factor is changed depending on an angle θ between the first and second links 152 and 153 (hereinafter, also referred to as a "link angle θ"). The link angle θ is obtained from the position of the crosshead 151. In a case where the link angle θ is 180°, the toggle factor is at its maximum.

In a case where a thickness of the mold unit 800 is changed due to replacement of the mold unit 800, a change in a temperature of the mold unit 800, or the like, a mold space is adjusted such that a predetermined mold clamping force is obtained during mold clamping. In the adjustment of a mold space, the interval L between the stationary platen 110 and the toggle support 130 is adjusted such that the link angle θ of the toggle mechanism 150 is a predetermined angle at a time of mold touch when, for example, the movable mold 820 touches the stationary mold 810.

The mold clamping unit 100 includes a mold space adjustment mechanism 180. The mold space adjustment mechanism 180 adjusts the interval L between the stationary platen 110 and the toggle support 130 to adjust a mold space. A timing when a mold space is adjusted is, for example, between the end of a molding cycle and the start of the next molding cycle. The mold space adjustment mechanism 180 includes, for example, screw shafts 181 that are formed at rear end portions of the tie bars 140, screw nuts 182 that are rotatably held by the toggle support 130 not to be capable of advancing and retreating, and a mold space adjustment motor 183 that rotates the screw nuts 182 screwed to the screw shafts 181.

The screw shaft 181 and the screw nut 182 are provided for each tie bar 140. A rotational driving force of the mold space adjustment motor 183 may be transmitted to a plurality of screw nuts 182 via a rotational driving force transmission unit 185. The plurality of screw nuts 182 can be rotated in synchronization. It is also possible to individually rotate the plurality of screw nuts 182 by changing a transmission channel of the rotational driving force transmission unit 185.

The rotational driving force transmission unit 185 includes, for example, gears and the like. In this case, a driven gear is formed on an outer periphery of each screw nut 182, a driving gear is attached to an output shaft of the mold space adjustment motor 183, and an intermediate gear, which meshes with a plurality of driven gears and the driving gear, is rotatably held at a central portion of the toggle support 130. The rotational driving force transmission unit 185 may include a belt, pulleys, and the like instead of the gears.

The operation of the mold space adjustment mechanism 180 is controlled by the control device 700. The control device 700 drives the mold space adjustment motor 183 to rotate the screw nuts 182. As a result, the position of the toggle support 130 with respect to the tie bars 140 is adjusted, so that the interval L between the stationary platen 110 and the toggle support 130 is adjusted. A plurality of mold space adjustment mechanisms may be used in combination.

The interval L is measured using a mold space adjustment motor encoder 184. The mold space adjustment motor encoder 184 measures an amount of rotation and a rotation direction of the mold space adjustment motor 183, and sends signals indicating detection results thereof to the control device 700. The detection results of the mold space adjustment motor encoder 184 are used for the monitoring and control of the position of the toggle support 130 and the interval L. A toggle support position detector for measuring the position of the toggle support 130 and an interval detector for measuring the interval L are not limited to the mold space adjustment motor encoder 184, and general detectors can be used.

The mold clamping unit 100 may include a mold temperature controller that adjusts the temperature of the mold unit 800. The mold unit 800 includes a flow channel for a temperature control medium therein. The mold temperature controller adjusts a temperature of a temperature control medium, which is supplied to the flow channel of the mold unit 800, to adjust the temperature of the mold unit 800.

The mold clamping unit 100 of the present embodiment is of a horizontal type in which a mold opening/closing direction is a horizontal direction, but may be of a vertical type in which a mold opening/closing direction is a vertical direction.

The mold clamping unit 100 of the present embodiment includes the mold clamping motor 160 as a drive unit, but may include a hydraulic cylinder instead of the mold clamping motor 160. Further, the mold clamping unit 100 may include a linear motor for opening and closing the mold and may include an electromagnet for clamping the mold.

Ejector Unit

In the description of the ejector unit 200, as in the description of the mold clamping unit 100, the moving direction of the movable platen 120 in a case where the mold is to be closed (for example, the X-axis positive direction) will correspond to a front, and the moving direction of the movable platen 120 in a case where the mold is to be opened (for example, the X-axis negative direction) will correspond to a rear.

The ejector unit 200 is attached to the movable platen 120, and advances and retreats together with the movable platen 120. The ejector unit 200 includes ejector rods 210 that eject the molding products from the mold unit 800, and a drive mechanism 220 that moves the ejector rods 210 in the moving direction of the movable platen 120 (X-axis direction).

The ejector rods 210 are disposed in through-holes of the movable platen 120 to be capable of advancing and retreating. Front end portions of the ejector rods 210 are in contact with an ejector plate 826 of the movable mold 820. The front end portions of the ejector rods 210 may be connected to or may not be connected to the ejector plate 826.

The drive mechanism 220 includes, for example, an ejector motor and a motion conversion mechanism that converts a rotary motion of the ejector motor into a linear motion of the ejector rods 210. The motion conversion mechanism includes a screw shaft and a screw nut that is screwed to the screw shaft. Balls or rollers may be interposed between the screw shaft and the screw nut.

The ejector unit 200 performs an ejection process under the control of the control device 700. In the ejection process, the ejector rods 210 are caused to advance up to an ejection position from a standby position at a set movement speed, so that the ejector plate 826 is caused to advance to eject the molding products. After that, the ejector motor is driven to cause the ejector rods 210 to retreat at a set movement speed and to cause the ejector plate 826 to retreat up to the original standby position.

The position and the movement speed of each ejector rod 210 are measured using, for example, an ejector motor encoder. The ejector motor encoder measures rotation of the ejector motor, and sends a signal indicating a detection result thereof to the control device 700. An ejector rod position detector for measuring the position of each ejector rod 210 and an ejector rod movement speed detector for measuring the movement speed of each ejector rod 210 are not limited to the ejector motor encoder, and general detectors can be used.

Injection Unit

In the description of the injection unit 300, unlike in the description of the mold clamping unit 100 and the description of the ejector unit 200, a moving direction of a screw 330 during filling (for example, the X-axis negative direction) will correspond to a front, and a moving direction of the screw 330 during metering (for example, the X-axis positive direction) will correspond to a rear.

The injection unit 300 is installed on a slide base 301, and the slide base 301 is disposed to be capable of advancing and retreating with respect to the injection unit frame 920. The injection unit 300 is disposed to be capable of advancing and retreating with respect to the mold unit 800. The injection unit 300 touches the mold unit 800, and fills the cavity spaces 801 formed in the mold unit 800 with a molding material. The injection unit 300 includes, for example, a cylinder 310 that heats the molding material, a nozzle 320 that is provided at a front end portion of the cylinder 310, the screw 330 that is disposed in the cylinder 310 to be capable of advancing and retreating and to be rotatable, a plasticizing motor 340 that rotates the screw 330, an injection motor 350 that causes the screw 330 to advance and retreat, and a load detector 360 that measures a load transmitted between the injection motor 350 and the screw 330.

The cylinder 310 heats the molding material fed from a feed port 311 to the inside. The molding material includes, for example, a resin and the like. The molding material is formed in the shape of, for example, pellets and is fed to the feed port 311 in a solid state. The feed port 311 is formed at a rear portion of the cylinder 310. A cooler 312, such as a water cooling cylinder, is provided on an outer periphery of the rear portion of the cylinder 310. First heating units 313, such as band heaters, and first temperature measurers 314 are provided on the outer periphery of the cylinder 310 in front of the cooler 312.

The cylinder 310 is divided into a plurality of zones in an axial direction of the cylinder 310 (for example, the X-axis direction). The first heating unit 313 and the first temperature measurer 314 are provided in each of the plurality of zones. A set temperature is set in each of the plurality of zones, and the control device 700 controls the first heating units 313 such that temperatures measured by the first temperature measurers 314 reach the set temperatures.

The nozzle 320 is provided at the front end portion of the cylinder 310, and is pressed against the mold unit 800. Second heating units 323 and second temperature measurers 324 are provided on an outer periphery of the nozzle 320. The control device 700 controls the second heating units 323 such that the measured temperature of the nozzle 320 reaches a set temperature.

The screw 330 is disposed in the cylinder 310 to be capable of advancing and retreating and to be rotatable. In a case where the screw 330 is rotated, a molding material is fed forward along a helical groove of the screw 330. The molding material is gradually melted by heat from the cylinder 310 while being fed forward. As the liquid molding material is fed in front of the screw 330 and is accumulated in the front portion of the cylinder 310, the screw 330 is caused to retreat. After that, in a case where the screw 330 is caused to advance, the liquid molding material accumulated in front of the screw 330 is injected from the nozzle 320 and the mold unit 800 is filled with the molding material.

A backflow prevention ring 331 is attached to a front portion of the screw 330 to be capable of advancing and retreating as a backflow prevention valve that prevents backflow of the molding material flowing rearward from the front of the screw 330 in a case where the screw 330 is pushed forward.

In a case where the screw 330 is caused to advance, the backflow prevention ring 331 is pushed rearward by the pressure of the molding material accumulated in front of the screw 330 and retreats relative to the screw 330 up to a close position (see FIG. 2) where the flow channel for a molding material is closed. Accordingly, the molding material accumulated in front of the screw 330 is prevented from flowing back to the rear.

On the other hand, in a case where the screw 330 is rotated, the backflow prevention ring 331 is pushed forward by the pressure of the molding material fed forward along the helical groove of the screw 330 and advances relative to the screw 330 up to an open position (see FIG. 1) where the flow channel for a molding material is opened. Accordingly, the molding material is fed in front of the screw 330.

The backflow prevention ring 331 may be of either a co-rotation type that is rotated together with the screw 330 or a non-co-rotation type that is not rotated together with the screw 330.

The injection unit 300 may include a drive source that causes the backflow prevention ring 331 to advance and retreat with respect to the screw 330 between the open position and the close position.

The plasticizing motor 340 rotates the screw 330. A drive source that rotates the screw 330 is not limited to the plasticizing motor 340, and may be, for example, a hydraulic pump or the like.

The injection motor 350 causes the screw 330 to advance and retreat. A motion conversion mechanism that converts a rotary motion of the injection motor 350 into a linear motion of the screw 330, and the like are provided between the injection motor 350 and the screw 330. The motion conversion mechanism includes, for example, a screw shaft and a screw nut that is screwed to the screw shaft. Balls, rollers, or the like may be provided between the screw shaft and the screw nut. A drive source that causes the screw 330 to advance and retreat is not limited to the injection motor 350, and may be, for example, a hydraulic cylinder or the like.

The load detector 360 measures a load that is transmitted between the injection motor 350 and the screw 330. The measured load is converted into a pressure by the control device 700. The load detector 360 is provided in a transmission channel for a load between the injection motor 350 and the screw 330, and measures a load that acts on the load detector 360.

The load detector 360 sends a signal of the measured load to the control device 700. The load measured by the load detector 360 is converted into a pressure that acts between the screw 330 and the molding material, and is used for the control and monitoring of a pressure that is received by the screw 330 from the molding material, a back pressure that acts on the screw 330, a pressure that acts on the molding material from the screw 330, and the like.

A pressure detector that measures the pressure of the molding material is not limited to the load detector 360, and a general detector can be used. For example, a nozzle pressure sensor or a mold internal pressure sensor may be used. The nozzle pressure sensor is installed in the nozzle 320. The mold internal pressure sensor is installed in the mold unit 800.

The injection unit 300 performs a plasticizing process, a filling process, a pressure holding process, and the like under the control of the control device 700. The filling process and the pressure holding process may also be collectively referred to as an injection process.

In the plasticizing process, the plasticizing motor 340 is driven to rotate the screw 330 at a set rotational speed to feed the molding material forward along the helical groove of the screw 330. Accordingly, the molding material is gradually melted. As the liquid molding material is fed in front of the screw 330 and is accumulated in the front portion of the cylinder 310, the screw 330 is caused to retreat. A rotational speed of the screw 330 is measured using, for example, a plasticizing motor encoder 341. The plasticizing motor encoder 341 measures rotation of the plasticizing motor 340 and sends a signal indicating a detection result thereof to the control device 700. A screw rotational speed detector that measures the rotational speed of the screw 330 is not limited to the plasticizing motor encoder 341, and a general detector can be used.

In the plasticizing process, the injection motor 350 may be driven to apply a set back pressure to the screw 330 to limit the sudden retreat of the screw 330. The back pressure applied to the screw 330 is measured using, for example, the load detector 360. In a case where the screw 330 retreats up to a metering completion position and a predetermined amount of molding material is accumulated in front of the screw 330, the plasticizing process is completed.

Positions and rotational speeds of the screw 330 in the plasticizing process are collectively set as a series of set conditions. For example, a metering start position, a rotational speed switching position, and a metering completion position are set. These positions are arranged in this order from the front side toward the rear, and indicate starting points and end points of sections in which the rotational speeds are set. The rotational speed is set for each section. One rotational speed switching position may be set, or a plurality of rotational speed switching positions may be set. The rotational speed switching position may not be set. Further, a back pressure is set for each section.

In the filling process, the injection motor 350 is driven to cause the screw 330 to advance at a set movement speed and to fill the cavity spaces 801 formed in the mold unit 800 with the liquid molding material accumulated in front of the screw 330. The position and movement speed of the screw 330 are measured using, for example, an injection motor encoder 351. The injection motor encoder 351 measures rotation of the injection motor 350 and sends a signal indicating a detection result thereof to the control device 700. In a case where the position of the screw 330 reaches a set position, switching of the filling process to the pressure holding process (so-called V/P switching) is performed. A position where V/P switching is performed is also referred to as a V/P switching position. The set movement speed of the screw 330 may be changed depending on the position of the screw 330, a time, or the like.

Positions and movement speeds of the screw 330 in the filling process are collectively set as a series of set conditions. For example, a filling start position (also referred to as an "injection start position"), a movement speed switching position, and a V/P switching position are set. These positions are arranged in this order from the rear side toward the front, and indicate starting points and end points of sections in which the movement speeds are set. The movement speed is set for each section. One movement speed switching position may be set, or a plurality of movement speed switching positions may be set. The movement speed switching position may not be set.

An upper limit of the pressure of the screw 330 is set for each section in which the movement speed of the screw 330 is set. The pressure of the screw 330 is measured by the load detector 360. In a case where the pressure of the screw 330 is equal to or lower than a setting pressure, the screw 330 advances at a set movement speed. On the other hand, in a case where the pressure of the screw 330 exceeds the setting pressure, the screw 330 advances at a movement speed lower than the set movement speed so that the pressure of the screw 330 is equal to or lower than the setting pressure for the purpose of protecting the mold.

After the position of the screw 330 reaches the V/P switching position in the filling process, the screw 330 may be caused to temporarily stop at the V/P switching position, and the V/P switching may be then performed. Immediately before the V/P switching, instead of the screw 330 being stopped, the screw 330 may advance at a very low speed or retreat at a very low speed. Further, a screw position detector for measuring the position of the screw 330 and a screw movement speed detector for measuring the movement speed of the screw 330 are not limited to the injection motor encoder 351, and general detectors can be used.

In the pressure holding process, the injection motor 350 is driven to push the screw 330 forward to maintain the pressure of the molding material at a front end portion of the screw 330 (hereinafter, also referred to as a "holding pressure") at a setting pressure and to push a molding material remaining in the cylinder 310 toward the mold unit 800. An insufficient amount of the molding material due to cooling shrinkage inside the mold unit 800 can be replenished. The holding pressure is measured using, for example, the load detector 360. A set value of the holding pressure may be changed depending on a time that has passed from the start of the pressure holding process, or the like. A plurality of holding pressures and a plurality of holding times in which the holding pressure is held in the pressure holding process may be set, and may be collectively set as a series of set conditions.

The molding material, with which the cavity spaces 801 formed in the mold unit 800 is filled, is gradually cooled in the pressure holding process, and an inlet of the cavity spaces 801 is closed by the solidified molding material at the time of completion of the pressure holding process. This state is referred to as a gate seal, and the backflow of the molding material from the cavity spaces 801 is prevented. A cooling process is started after the pressure holding process. The molding material in the cavity spaces 801 is solidified in the cooling process. The plasticizing process may be performed in the cooling process for the purpose of shortening a molding cycle time.

The injection unit 300 of the present embodiment is of an in-line screw type, but may be of a pre-plasticizing type or the like. A pre-plasticizing type injection unit feeds a molding material, which is melted in a plasticizing cylinder, to an injection cylinder and injects the molding material into a mold unit from the injection cylinder. A screw is disposed in the plasticizing cylinder to be rotatable and not to be capable of advancing and retreating, or a screw is disposed in the plasticizing cylinder to be rotatable and to be capable of advancing and retreating. Meanwhile, a plunger is disposed in the injection cylinder to be capable of advancing and retreating.

Further, the injection unit 300 of the present embodiment is of a horizontal type in which the axial direction of the cylinder 310 is a horizontal direction, but may be of a vertical type in which the axial direction of the cylinder 310 is a vertical direction. A mold clamping unit to be combined with a vertical type injection unit 300 may be of a vertical type or a horizontal type. Likewise, a mold clamping unit to be combined with a horizontal type injection unit 300 may be of a horizontal type or a vertical type.

Moving Unit

In the description of the moving unit 400, as in the description of the injection unit 300, the moving direction of the screw 330 during filling (for example, the X-axis negative direction) will correspond to a front, and the moving direction of the screw 330 during metering (for example, the X-axis positive direction) will correspond to a rear.

The moving unit 400 causes the injection unit 300 to advance and retreat with respect to the mold unit 800. Further, the moving unit 400 presses the nozzle 320 against the mold unit 800 to generate a nozzle touch pressure. The moving unit 400 includes a hydraulic pump 410, a motor 420 as a drive source, a hydraulic cylinder 430 as a hydraulic actuator, and the like.

The hydraulic pump 410 includes a first port 411 and a second port 412. The hydraulic pump 410 is a pump that can be rotated in both directions, and sucks hydraulic fluid (for example, oil) from any one of the first port 411 and the second port 412 and discharges the hydraulic fluid from the other thereof to generate hydraulic pressure in a case where a rotation direction of the motor 420 is changed. The hydraulic pump 410 can also suck hydraulic fluid from a tank and discharge the hydraulic fluid from any one of the first port 411 and the second port 412.

The motor 420 causes the hydraulic pump 410 to operate. The motor 420 drives the hydraulic pump 410 in a rotation direction, which corresponds to a control signal sent from the control device 700, with rotation torque corresponding to the control signal. The motor 420 may be an electric motor or may be an electric servomotor.

The hydraulic cylinder 430 includes a cylinder body 431, a piston 432, and a piston rod 433. The cylinder body 431 is fixed to the injection unit 300. The piston 432 partitions the inside of the cylinder body 431 into a front chamber 435 as a first chamber and a rear chamber 436 as a second chamber. The piston rod 433 is fixed to the stationary platen 110.

The front chamber 435 of the hydraulic cylinder 430 is connected to the first port 411 of the hydraulic pump 410 via a first flow channel 401. In a case where hydraulic fluid discharged from the first port 411 is supplied to the front chamber 435 via the first flow channel 401, the injection unit 300 is pushed forward. The injection unit 300 advances, so that the nozzle 320 is pressed against the stationary mold 810. The front chamber 435 functions as a pressure chamber that generates the nozzle touch pressure of the nozzle 320 with the pressure of the hydraulic fluid supplied from the hydraulic pump 410.

On the other hand, the rear chamber 436 of the hydraulic cylinder 430 is connected to the second port 412 of the hydraulic pump 410 via a second flow channel 402. In a case where hydraulic fluid discharged from the second port 412 is supplied to the rear chamber 436 of the hydraulic cylinder 430 via the second flow channel 402, the injection unit 300 is pushed rearward. The injection unit 300 retreats, so that the nozzle 320 is separated from the stationary mold 810.

The moving unit 400 includes the hydraulic cylinder 430 in the present embodiment, but the present invention is not limited thereto. For example, an electric motor and a motion conversion mechanism that converts a rotary motion of the electric motor into a linear motion of the injection unit 300 may be used instead of the hydraulic cylinder 430.

Control Device

The control device 700 is formed of, for example, a computer and includes a central processing unit (CPU) 701, a storage medium 702, such as a memory, an input interface 703, and an output interface 704 as shown in FIGS. 1 and 2. The control device 700 causes the CPU 701 to execute a program, which is stored in the storage medium 702, to perform various types of control. Further, the control device 700 receives a signal from the outside through the input interface 703, and transmits a signal to the outside through the output interface 704.

The control device 700 repeatedly performs the plasticizing process, the mold closing process, the pressurization process, the mold clamping process, the filling process, the pressure holding process, the cooling process, the depressurization process, the mold opening process, the ejection process, and the like to repeatedly manufacture molding products. A series of operations for obtaining molding products, for example, operations from the start of a plasticizing process to the start of the next plasticizing process, are also referred to as a "shot" or a "molding cycle". Further, a time required for one shot is also referred to as a "molding cycle time" or a "cycle time".

One molding cycle includes, for example, the plasticizing process, the mold closing process, the pressurization process, the mold clamping process, the filling process, the pressure holding process, the cooling process, the depressurization process, the mold opening process, and the ejection process in this order. The order mentioned here is an order in which the respective processes are started. The filling process, the pressure holding process, and the cooling process are performed during the mold clamping process. The start of the mold clamping process may coincide with the start of the filling process. The completion of the depressurization process may coincide with the start of the mold opening process.

A plurality of processes may be simultaneously performed for the purpose of shortening a molding cycle time. For example, a plasticizing process may be performed during a cooling process of a previous molding cycle, or may be performed during a mold clamping process. In this case, the mold closing process may be performed at the beginning of the molding cycle. Further, the filling process may be started during the mold closing process. Furthermore, the ejection process may be started during the mold opening process. In a case where an on-off valve for opening and closing a flow channel of the nozzle 320 is provided, the mold opening process may be started during the plasticizing process. The reason for this is that a molding material does not leak from the nozzle 320 as long as the on-off valve closes the flow channel of the nozzle 320 even though the mold opening process is started during the plasticizing process.

One molding cycle may include processes other than the plasticizing process, the mold closing process, the pressurization process, the mold clamping process, the filling process, the pressure holding process, the cooling process, the depressurization process, the mold opening process, and the ejection process.

For example, a pre-metering suck-back process for causing the screw 330 to retreat up to a preset metering start position may be performed before the start of the plasticizing process after the completion of the pressure holding process. Since the pressure of the molding material accumulated in front of the screw 330 can be reduced before the start of the plasticizing process, the sudden retreat of the screw 330 at the time of start of the plasticizing process can be prevented.

Further, a post-metering suck-back process for causing the screw 330 to retreat up to a preset filling start position (also referred to as an "injection start position") may be performed before the start of the filling process after the completion of the plasticizing process. Since the pressure of the molding material accumulated in front of the screw 330 can be reduced before the start of the filling process, leakage of the molding material from the nozzle 320 before the start of the filling process can be prevented.

The control device 700 is connected to an operation unit 750 that receives an input operation performed by a user and to a display unit 760 that displays a screen. The operation unit 750 and the display unit 760 may be formed of, for example, a touch panel 770 and may be integrated with each other. The touch panel 770 as the display unit 760 displays a screen under the control of the control device 700. For example, information, such as the settings of the injection molding machine 10 and the current state of the injection molding machine 10, may be displayed on the screen of the touch panel 770. Further, for example, operation sections, such as buttons or input fields used to receive an input operation performed by a user, may be displayed on the screen of the touch panel 770. The touch panel 770 as the operation unit 750 detects an input operation performed on the screen by a user, and outputs a signal corresponding to the input operation to the control device 700. Accordingly, for example, a user can operate the operation section provided on the screen to set the injection molding machine 10 (including the input of a set value) while checking information displayed on the screen. Further, a user can operate the operation section provided on the screen to cause the operation of the injection molding machine 10, which corresponds to the operation section, to be performed. The operation of the injection molding machine 10 may be, for example, the operation (also including stopping) of the mold clamping unit 100, the ejector unit 200, the injection unit 300, the moving unit 400, or the like. Further, the operation of the injection molding machine 10 may be switching of the screen that is displayed on the touch panel 770 as the display unit 760, or the like.

The operation unit 750 and the display unit 760 of the present embodiment have been described as being integrated as the touch panel 770, but may be provided independently of each other. Further, a plurality of operation units 750 may be provided. The operation unit 750 and the display unit 760 are disposed on an operation side (Y-axis negative direction) of the mold clamping unit 100 (more specifically, the stationary platen 110).

Identification of Screw

Figure 3:
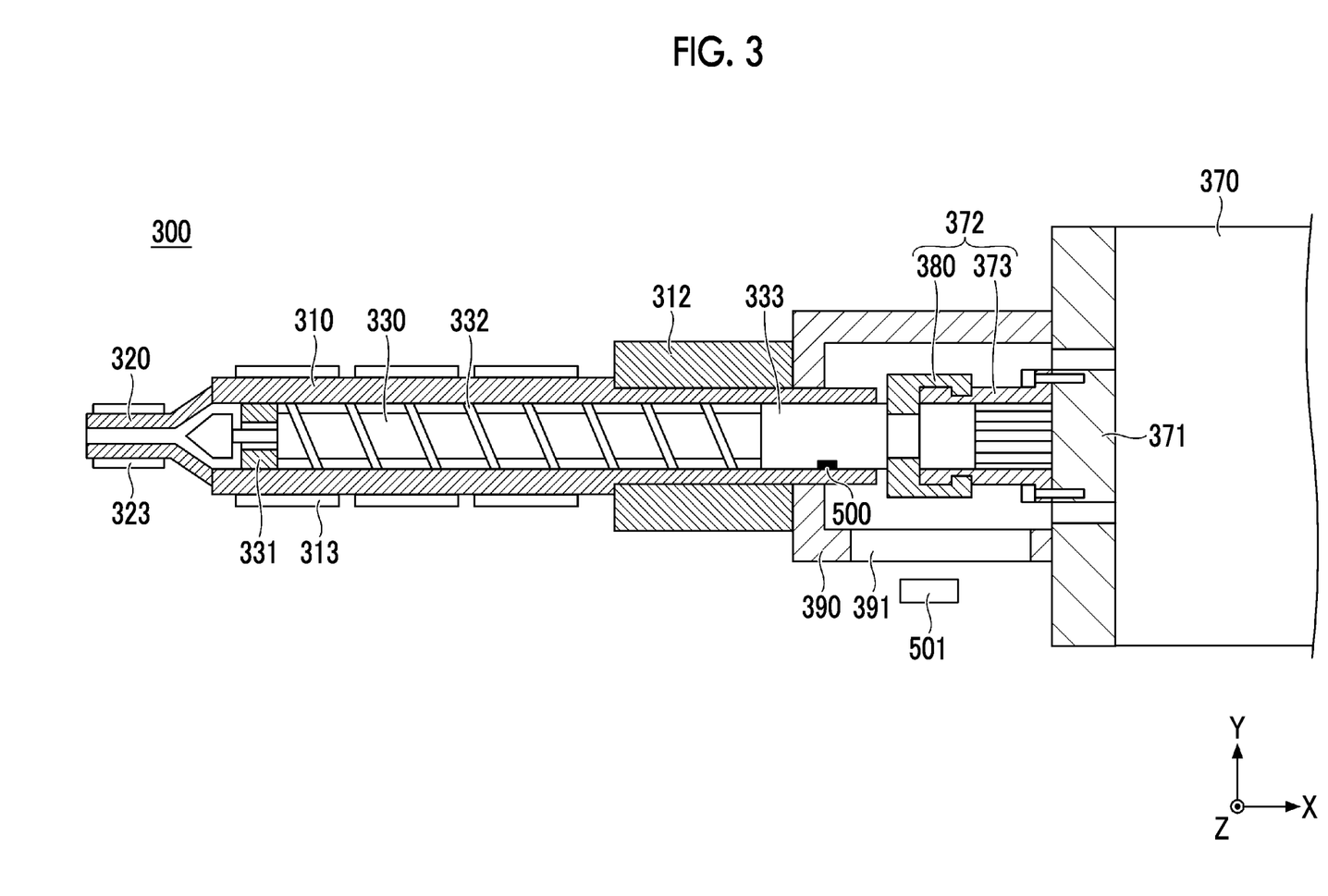
FIG. 3 is a cross-sectional view showing a first example of an injection unit, and is a cross-sectional view showing a state in a case where a screw is at a forward limit position.
Figure 4:
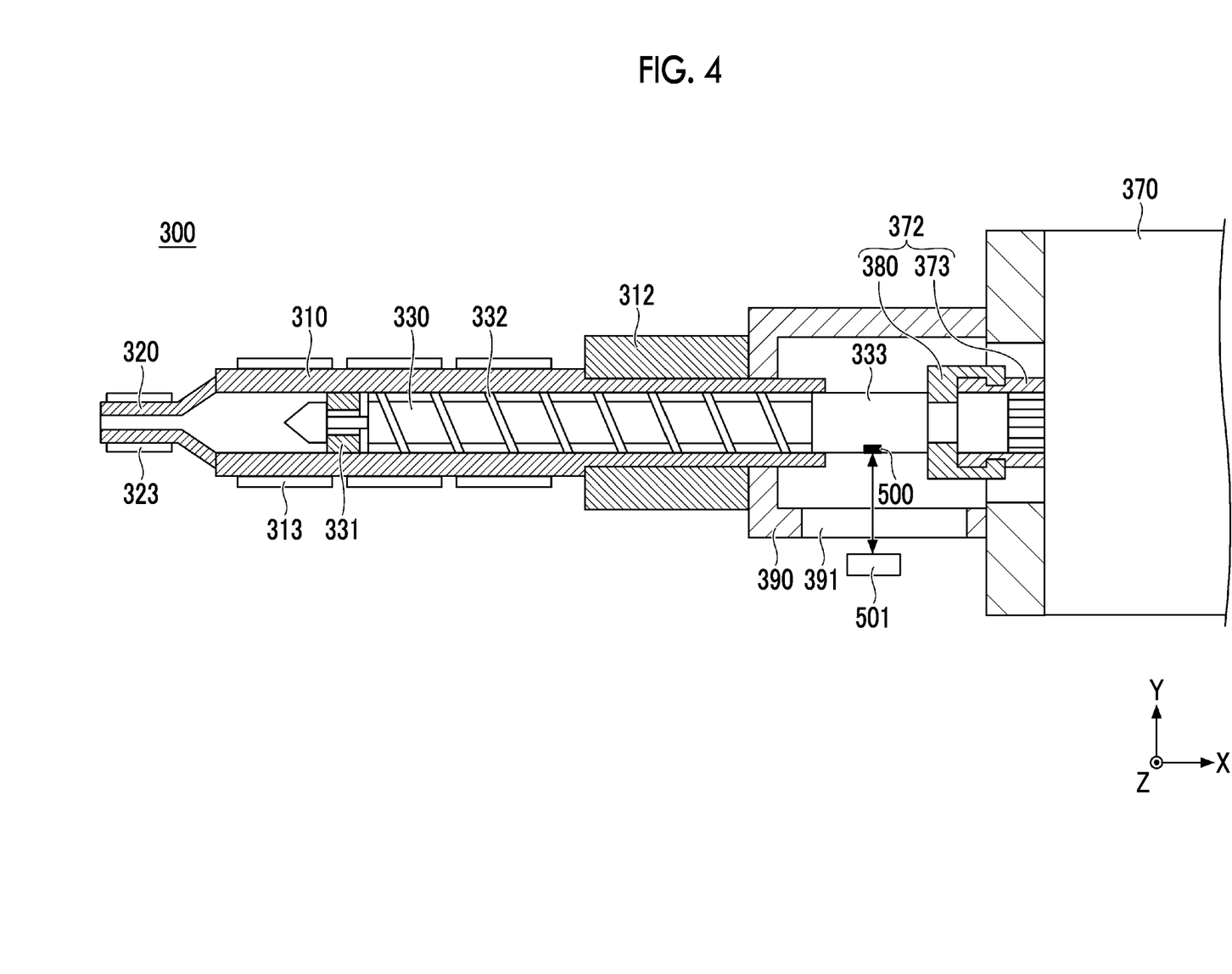
FIG. 4 is a cross-sectional view showing an example of a state in which the screw of FIG. 3 is retreated.

Next, a first example of the injection unit 300 will be described with reference to FIGS. 3 to 5. As shown in FIGS. 3 and 4, the injection unit 300 includes, for example, a cylinder 310, a nozzle 320, a screw 330, and a drive unit 370. The drive unit 370 performs rotation and advancing and retreating of the screw 330. For example, the drive unit 370 includes the plasticizing motor 340 and the injection motor 350 shown in FIGS. 1 and 2.

The screw 330 has a flight 332 that is disposed inside the cylinder 310, and a piston 333 that protrudes rearward from inside of the cylinder 310. The flight 332 forms a helical groove. When the screw 330 is rotated, the resin is fed forward along the helical groove. The piston 333 is formed, for example, in a columnar shape and closes an opening at a rear end of the cylinder 310 to suppress the outflow of powder dust of the resin.

The injection unit 300 includes a movable member 371 that transmits a driving force of the drive unit 370 to the screw 330, and a connection member 372 that connects the movable member 371 and the screw 330. The drive unit 370 performs rotation and advancing and retreating of the movable member 371, thereby performing rotation and advancing and retreating of the screw 330.

The injection unit 300 includes a box 390 that internally forms a room in which connection work between the movable member 371 and the screw 330 is performed. A cylinder 310 is fixed to a front surface of the box 390 via a cooler 312. The rear end of the cylinder 310 is accommodated inside the box 390, and the piston 333 of the screw 330 protrudes from the rear end of the cylinder 310. The box 390 includes an opening 391 through which a worker performing the connection work enters. The opening 391 is provided on a side surface (for example, a side surface on the operation side) of the box 390.

Figure 5:
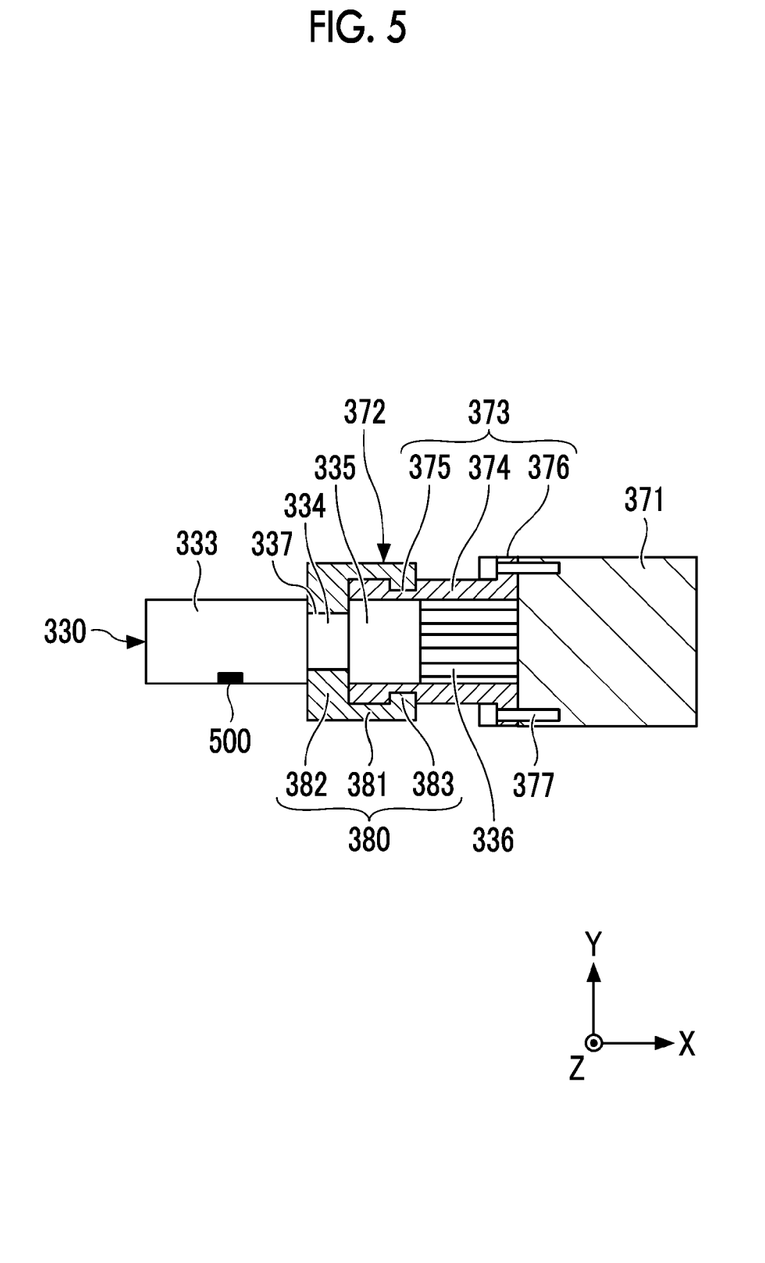
FIG. 5 is a cross-sectional view showing an example of a movable member and a connection member.

As shown in FIG. 5, the screw 330 includes, for example, a relay shaft 334, a straight shaft 335, and a spline shaft 336 in this order from the front side to the rear side behind the piston 333 to be connected to the movable member 371 by the connection member 372. The relay shaft 334 has a diameter smaller than that of the piston 333 and the straight shaft 335, and forms an annular groove 337 between the piston 333 and the straight shaft 335.

The connection member 372 includes a coupling 373 that rotates the screw 330 together with the movable member 371, and a sack-back flange 380 that retreats the screw 330 together with the movable member 371. The movable member 371 is provided at the rear side of the screw 330. Therefore, when the drive unit 370 advances the movable member 371, the screw 330 is advanced together with the movable member 371.

The coupling 373 includes a first tube 374, an annular groove 375 formed on an outer peripheral surface of the first tube 374, and an outer flange 376 formed at a rear end of the outer peripheral surface of the first tube 374. The outer flange 376 is connected to the movable member 371 by a bolt 377 or the like.

The first tube 374 includes, inside thereof, a straight hole into which the straight shaft 335 is inserted and a spline hole into which the spline shaft 336 is inserted, from the front side to the rear side. The spline shaft 336 is spline-coupled to the first tube 374 and is rotated together with the first tube 374. As a result, the screw 330 is rotated together with the movable member 371.

The sack-back flange 380 has a second tube 381, a first inner flange 382, and a second inner flange 383. The first inner flange 382 is formed at a front end of an inner peripheral surface of the second tube 381. The second inner flange 383 is formed at a rear end of the inner peripheral surface of the second tube 381.

The sack-back flange 380 is divided into two divided bodies in a circumferential direction of the second tube 381. The two divided bodies are connected by a bolt (not shown). The first inner flange 382 is fitted into the annular groove 337 of the screw 330. The second inner flange 383 is fitted into the annular groove 375 of the coupling 373. As a result, the screw 330 is retreated together with the movable member 371.

The screw 330 is connected to the movable member 371 by the connection member 372, and is appropriately replaced. A tag 500 is attached to the screw 330. The tag 500 includes identification information that is readable by a reading unit 501 illustrated in FIGS. 3 and 4. The identification information is information for identifying a plurality of screws 330. By identifying the screw 330, control according to the screw 330 can be performed. The tag 500 includes, for example, a two-dimensional code such as a QR code (registered trademark) or a one-dimensional code. The reading unit 501 includes a camera and the like.

The tag 500 is attached to an outer peripheral surface of the screw 330, for example, by printing or cutting. The tag 500 may be provided in a recessed portion (not shown) on the outer peripheral surface of the screw 330 not to rub against an inner peripheral surface of the cylinder 310. The tag 500 may be a radio frequency identification (RFID) tag, that is, a wireless IC chip, or may be embedded inside the screw 330. In a case where the tag 500 is a wireless IC chip, the reading unit 501 includes a wireless communication device.

The control device 700 controls movement of the tag 500 to a reading position at which the identification information of the tag 500 is read by the reading unit 501. As shown in FIG. 4, the control device 700 controls the tag 500 to be directed toward the reading unit 501. As a result, an error in reading the identification information of the screw 330 can be suppressed, and the screw 330 can be identified. The control device 700 preferably performs control to stop the screw 330 at the reading position. However, the screw 330 may be rotated at a low speed, or the screw 330 may be advanced and retreated at a low speed.

The control device 700 acquires a position in a rotation direction of the screw 330, for example, by using an encoder 341 of the plasticizing motor 340. In addition, the control device 700 acquires a position in a front-rear direction of the screw 330, for example, by using an encoder 351 of the injection motor 350. In this manner, the control device 700 can control the position in the rotation direction and the position in the front-rear direction of the screw 330, and can control a position in a rotation direction and a position in a front-rear direction of the tag 500. The reading position (the position in the rotation direction and the position in the front-rear direction) of the tag 500 is stored in advance, and is read for reference.

For example, the tag 500 is attached to the piston 333 of the screw 330. As shown in FIG. 3, the tag 500 is accommodated inside the cylinder 310 in a case where the screw 330 is in the limit position (forward limit position) where the screw 330 can be mechanically advanced. By retreating the screw 330, the position of the tag 500 moves rearward with respect to the rear end of the cylinder 310. As shown in FIG. 4, the reading position of the tag 500 is a position rearward with respect to the rear end of the cylinder 310.

The tag 500 accommodated inside the cylinder 310 is pulled out rearward with respect to the rear end of the cylinder 310, and then the identification information of the tag 500 is read. In this manner, the screw 330 can be identified without increasing a total length of the screw 330 and without forming a through-hole, a cutout, or the like which may cause leakage of the powder dust of the resin in the cylinder 310.

For example, the reading position of the tag 500 is a position where the tag 500 faces the opening 391 of the box 390. For example, the reading unit 501 is provided outside the box 390 and is provided to face the opening 391 of the box 390. The reading unit 501 may be detachably provided not to interfere with the connection work between the movable member 371 and the screw 330. The reading unit 501 may be provided in the injection molding machine 10, or may be provided separately from the injection molding machine 10.

Note that, in FIGS. 3 and 4, the reading unit 501 is provided outside the box 390, but may be provided inside the box 390. In the second example, the third example, and the fourth example below, the reading unit 501 is provided outside the box 390, but may be provided inside the box 390.

Figure 6:
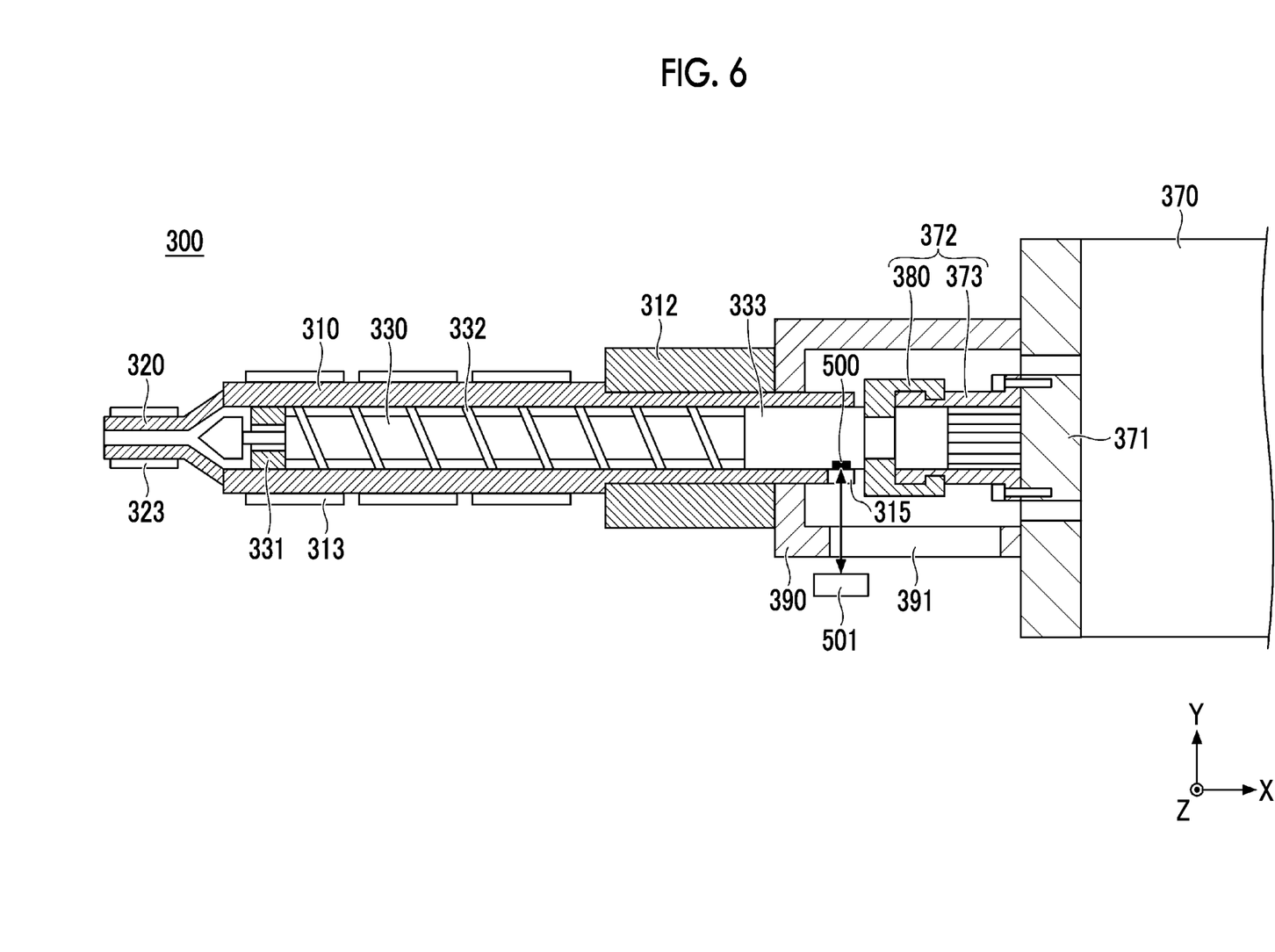
FIG. 6 is a cross-sectional view showing a second example of the injection unit.

Next, the second example of the injection unit 300 will be described with reference to FIG. 6. Hereinafter, differences from the first example of the injection unit 300 shown in FIGS. 3 and 4 will be mainly described. For example, the tag 500 is attached to the piston 333 of the screw 330. As shown in FIG. 6, the tag 500 is accommodated inside the cylinder 310 in a case where the screw 330 is in the mechanical forward limit position. The cylinder 310 has a cutout 315 at its rear end. The cutout 315 is formed to penetrate the cylinder 310 in a radial direction of the screw 330.

As shown in FIG. 6, the reading position of the tag 500 is, for example, a position where the tag 500 faces the cutout 315 of the cylinder 310. By providing the cutout 315 in the cylinder 310, the screw 330 can be identified without increasing the total length of the screw 330. Instead of the cutout 315, a through-hole may be provided in the cylinder 310.

Whether to provide the cutout 315 or the through-hole is selected according to a distance between the tag 500 and the rear end of the cylinder 310 in a case where the identification information of the tag 500 is read by the reading unit 501. In a case where the distance is short, the cutout 315 is used from the viewpoint of improving process efficiency. On the other hand, in a case where the distance is long, the through-hole is used from the viewpoint of improving process efficiency and suppressing leakage of the powder dust of the resin.

Next, the third example of the injection unit 300 will be described with reference to FIG. 7. Hereinafter, differences from the first example of the injection unit 300 shown in FIGS. 3 and 4 will be mainly described. For example, the tag 500 is attached to the straight shaft 335 of the screw 330.

The tag 500 may be attached to the spline shaft 336, but is preferably attached to the straight shaft 335 having a small frictional force. As shown in FIG. 7, the connection member 372 has a through-hole 384. The through-hole 384 is formed to penetrate the first tube 374 and the second tube 381 shown in FIG. 5 in the radial direction of the screw 330.

Figure 7:
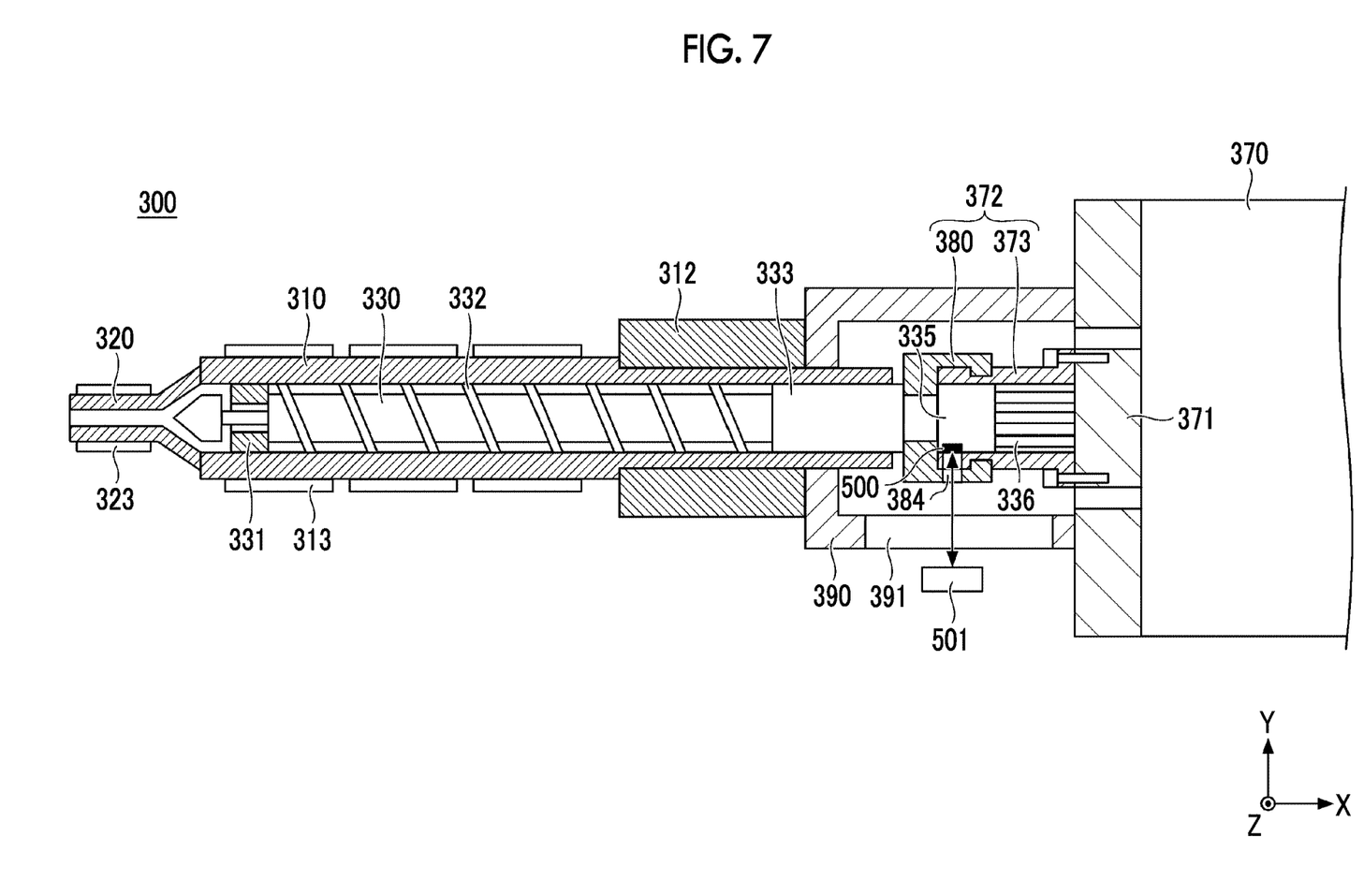
FIG. 7 is a cross-sectional view showing a third example of the injection unit.

As shown in FIG. 7, the reading position of the tag 500 is, for example, a position where the tag 500 faces the through-hole 384 of the connection member 372. By providing the through-hole 384 in the connection member 372, the screw 330 can be identified without increasing the total length of the screw 330 and without forming a through-hole or a cutout which may cause leakage of the powder dust of the resin in the cylinder 310. In addition, instead of the through-hole 384, a cutout may be provided in the connection member 372.

Figure 8:
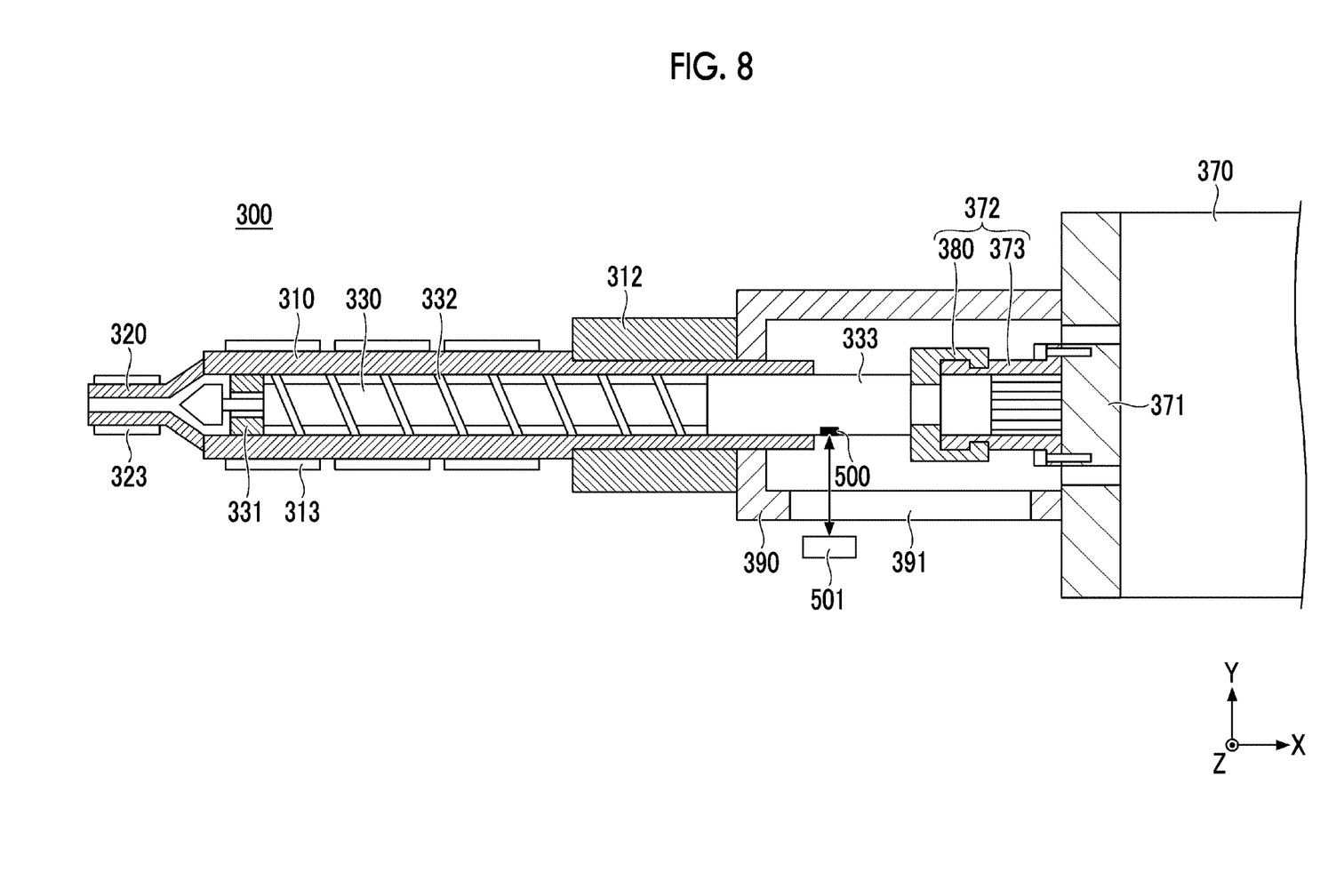
FIG. 8 is a cross-sectional view showing a fourth example of the injection unit.

Next, the fourth example of the injection unit 300 will be described with reference to FIG. 8. Hereinafter, differences from the first example of the injection unit 300 shown in FIGS. 3 and 4 will be mainly described. For example, the tag 500 is attached to the piston 333 of the screw 330. As shown in FIG. 8, in a case where the screw 330 is in the mechanical forward limit position, the tag 500 protrudes rearward with respect to the rear end of the cylinder 310. Accordingly, the tag 500 is always behind the cylinder 310 and is always outside the cylinder 310.

As shown in FIG. 8, the reading position of the tag 500 is a position rearward with respect to the rear end of the cylinder 310. The screw 330 can be identified without forming a through-hole or a cutout which may cause leakage of the powder dust of the resin in the cylinder 310. Further, since the tag 500 is always outside the cylinder 310, a degree of freedom of an installation position of the reading unit 501 is high.

The injection molding machine according to the embodiment of the present invention has been described above, but the present invention is not limited to the above-mentioned embodiment and the like. Various modifications, corrections, substitutions, additions, deletions, and combinations can be made within the scope of the appended claims. Naturally, those also belong to the technical scope of the present invention.

For example, in the above-described embodiment, the reading unit 501 is disposed outside the box 390 of the injection unit 300, and reads the identification information of the tag 500 through the opening 391 of the box 390. However, the reading unit 501 may be disposed inside the injection unit 300, and may read the identification information of the tag 500 inside the injection unit 300.

In addition, depending on the combination of the injection unit 300 and the screw 330, the position of the tag 500 may be slightly displaced. Further, the opening 391 is used not only for the purpose of reading the identification information of the tag 500 but also for the purpose of checking the connection between the screw 330 and the movable member 371. Therefore, the reading unit 501 may be configured so that the reading unit 501 can move in the axial direction, the circumferential direction, or the radial direction of the screw 330.

For example, as the reading unit 501, a portable reading device (for example, a hand scanner or a smartphone with a camera) that is separate from the injection molding machine 10 may be used. In that case, for example, the user may read the identification information of the tag 500 located at the position facing the opening 391 with the reading unit 501, and may transmit the read information from the reading unit 501 to the injection molding machine 10 in a wired or wireless manner.

When the reading unit 501 is movable, the following effects (A) to (B) can be obtained as compared with the case where the reading unit 501 is fixed.

(A) The user can finely adjust the position of the reading unit 501 manually even if the position of the tag 500 is slightly displaced.

(B) The reading unit 501 can be retreated from the vicinity of the opening 391 except when reading the identification information of the tag 500, and the opening 391 can be easily used for other purposes.

In a case where the position of the reading unit 501 is finely adjusted, the user may change the setting of the reading position of the tag 500 in accordance with the position of the reading unit 501. In a case where the reading unit 501 is movable, the tag 500 may be moved to a reading position (for example, a position facing the opening 391) before the reading unit 501 is disposed at a position facing the reading position of the tag 500.

It should be understood that the invention is not limited to the above-described embodiment, but may be modified into various forms on the basis of the spirit of the invention. Additionally, the modifications are included in the scope of the invention.

What is claimed is:

1. An injection molding machine comprising:
   a screw to which a tag including identification information that is readable by a reading unit is attached;
   a drive unit that performs rotation and advancing and retreating of the screw; and
   a control device that controls the drive unit,
   wherein the control device performs a control of moving the tag to a reading position at which the identification information is read by the reading unit, and
   the reading unit is movable to allow a position of the reading unit to be adjusted.

2. The injection molding machine according to claim 1, further comprising:
   a cylinder provided with the screw inside,
   wherein the screw includes a piston that protrudes rearward from inside of the cylinder,
   the tag is attached to the piston,
   the tag is accommodated inside the cylinder in a case where the screw is at a forward limit position, and
   the reading position is a position rearward with respect to a rear end of the cylinder.

3. The injection molding machine according to claim 1, further comprising:
   a cylinder provided with the screw inside,
   wherein the screw includes a piston that protrudes rearward from inside of the cylinder,
   the tag is attached to the piston,
   the tag is accommodated inside the cylinder in a case where the screw is at a forward limit position,
   the cylinder includes a through-hole or a cutout that penetrates to the screw in a radial direction, and
   the reading position is a position at which the tag faces the through-hole or the cutout of the cylinder.

4. The injection molding machine according to claim 1, further comprising:
   a movable member that transmits a driving force of the drive unit to the screw; and
   a connection member that connects the movable member and the screw,
   wherein the connection member includes a through-hole or a cutout that penetrates to the screw in a radial direction, and
   the reading position is a position at which the tag faces the through-hole or the cutout of the connection member.

5. The injection molding machine according to claim 1, further comprising:
   a cylinder provided with the screw inside,
   wherein the screw includes a piston that protrudes rearward from inside of the cylinder,
   the tag is attached to the piston,
   the tag protrudes rearward with respect to a rear end of the cylinder in a case where the screw is at a forward limit position, and
   the reading position is a position rearward with respect to the rear end of the cylinder.

6. The injection molding machine according to claim 1, further comprising:
   a movable member that transmits a driving force of the drive unit to the screw;
   a connection member that connects the movable member and the screw; and
   a box that internally forms a room in which connection work between the movable member and the screw is performed,
   wherein the box includes an opening through which a worker performing the connection work enters, and
   the reading position is a position at which the tag faces the opening of the box.

* * * * *